(12) United States Patent
Ette et al.

(10) Patent No.: US 10,071,706 B2
(45) Date of Patent: Sep. 11, 2018

(54) METHOD AND APPARATUS FOR EXTERNAL OPERATION OF AN ACTUATOR OF A VEHICLE

(71) Applicant: Volkswagen Aktiengesellschaft, Wolfsburg (DE)

(72) Inventors: Bernd Ette, Wolfsburg (DE); Volker Wintsche, Dresden (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/384,477

(22) Filed: Dec. 20, 2016

(65) Prior Publication Data

US 2017/0190314 A1 Jul. 6, 2017

(30) Foreign Application Priority Data

Jan. 4, 2016 (DE) .......................... 10 2016 100 069

(51) Int. Cl.
*B60R 25/20* (2013.01)
*B60Q 1/00* (2006.01)
*B60Q 1/50* (2006.01)

(52) U.S. Cl.
CPC ........ *B60R 25/2054* (2013.01); *B60Q 1/0023* (2013.01); *B60Q 1/503* (2013.01); *B60Q 2400/50* (2013.01)

(58) Field of Classification Search
CPC .. B60R 25/2054; B60Q 1/0023; B60Q 1/503; B60Q 2400/50
USPC ....................................................... 340/5.72
See application file for complete search history.

(56) References Cited

U.S. PATENT DOCUMENTS

| 9,316,271 | B2* | 4/2016 | Moorman | ............... F16D 25/14 |
| 2008/0296926 | A1* | 12/2008 | Hanzel | ............... B60R 25/2054 |
| | | | | 296/146.1 |
| 2014/0333763 | A1* | 11/2014 | Daly | .................. G06K 9/00771 |
| | | | | 348/135 |
| 2015/0145659 | A1* | 5/2015 | Ishigami | ................ B60R 16/02 |
| | | | | 340/435 |
| 2016/0083995 | A1* | 3/2016 | Dezorzi | .................. E05F 15/73 |
| | | | | 340/5.72 |
| 2016/0186480 | A1* | 6/2016 | Krauss | ................ B60R 25/2054 |
| | | | | 701/49 |
| 2017/0044816 | A1* | 2/2017 | Salter | ..................... E05F 15/73 |

(Continued)

FOREIGN PATENT DOCUMENTS

| DE | 102013019925 A1 | 5/2015 |
| DE | 102014101199 A1 * | 8/2015 |
| DE | 102014204911 A1 | 9/2015 |

(Continued)

*Primary Examiner* — Hirdepal Singh
(74) *Attorney, Agent, or Firm* — 2SPL Patentanwaelte PartG mbB; Mani Arabi

(57) ABSTRACT

The inventive relates to a method for external operation of an actuator of a vehicle having an optical sensor.

The following steps are provided: obtaining an approach of a person in an approach area of the optical sensor; determining, within an obtaining area of the optical sensor, a targeted approach of a person's steps towards an operating area of the optical sensor; and operating the actuator when a step made into the operating area of the optical sensor is determined.

It is the object of the invention to simplify the operation of an actuator of a vehicle by a gesture.

11 Claims, 3 Drawing Sheets

(56) References Cited

U.S. PATENT DOCUMENTS

2017/0106875 A1\* 4/2017 Yamasaki ............. B60W 50/08

FOREIGN PATENT DOCUMENTS

| DE | 102015009749 A1 | 2/2016 |
|----|-----------------|--------|
| EP | 2860704 A1 | 10/2013 |
| WO | 2015113549 A1 | 8/2015 |
| WO | 2015139882 A1 | 9/2015 |

\* cited by examiner

METHOD AND APPARATUS FOR EXTERNAL OPERATION OF AN ACTUATOR OF A VEHICLE

The invention relates to a method for external operation of an actuator of a vehicle, an apparatus for external operation of an actuator of a vehicle, and a vehicle.

In vehicles, importance is increasingly attached to the fact that the operation, in this context specifically the operation of an actuator, e.g., a tailgate, from outside the vehicle is facilitated.

DE 20 2009 018 206 U1 discloses an apparatus for operating a door or flap of a vehicle having at least two sensors spaced apart from one another, wherein the door is only opened when a movement of an object, e.g., of a foot, with at least one predetermined change of direction is detected.

DE 10 2013 200 457 A1 discloses an operating apparatus for a vehicle having a gesture monitoring unit, wherein a movement gesture comprises two movement portions and the first movement portion spatially merges into the second one and the directions of movement are reversed or angled to one another.

DE 10 2014 204 911 A1 discloses a method for operating a closing element of a vehicle, wherein the closing element is only operated if the gesture corresponds to a movement sequence directed towards a location and comprising the object moving backwards and the object remaining at the location during a predetermined time interval.

In all solutions known to open a trunk, specific movements, e.g., kicking gestures using the foot or similar, are required.

It is now the object of the invention to simplify the operation of an actuator of a vehicle by a gesture.

This task is solved by a method of claim 1, an apparatus of claim 8 and/or a vehicle of claim 10.

The inventive method for external operation of an actuator of a vehicle having an optical sensor comprises:
 Obtaining an approach of a person in an approach area of the optical sensor;
 Determining, within an obtaining area of the optical sensor, a targeted approach of a person's steps towards an operating area of the optical sensor;
 Operating the actuator when a step made into the operating area of the optical sensor is determined.

The inventive method has the advantage that the desire to open, e.g., a tailgate, may be expressed earlier than in case of a step on a spot or in case of a kicking movement. With the help of the approach determination, the sensor system should only become active with distance information when a person approaches a gesture sensor. The direction of the steps towards the obtaining area are already observed. A person passing by is determined when the steps and toes do not point in the direction of the optical sensor. Furthermore, the two feet or legs in the image are to be considered for an evaluation. Opening but also closing the tailgate already takes place prior to putting down the foot in the spot area, i.e., when determining one or several steps towards the operating area. The misuse determination when passing by becomes more robust, as both feet and their direction of movement are observed. Determination of the passing by may be significantly improved in the evaluation with two feet or legs and the determination of the passing by takes places at an earlier stage so that energy required by the vehicle is reduced. Opening or closing the tailgate is improved by the step determination, as a second targeted step may already result in operating the actuator and/or opening/closing the tailgate or door. It is presented a method for advance determination and evaluation as to whether or not a gesture is performed on the vehicle in the near future. This timely determination of the gesture allows a considerable reduction in dead times concerning the operation. In addition, no specific gesture, e.g., a step on a spot, an angled movement or a kicking movement, is required. By determining the person's individual steps, their intention, i.e., to approach the object operated by the actuator, e.g., a tailgate, may be determined in advance. This allows the operation, without any specific gestures, by the normal walk.

The approach area and/or the obtaining area may be adjusted to environmental conditions detected by the optical sensor. The dynamic adjustment of the obtaining area and/or approach area takes place when obstacles, .e.g., a narrow parking space, are determined. The dynamic adjustment is carried out in ongoing operation of the approach determination. If a parked vehicle restricts the approach area behind the vehicle, the area is dynamically made smaller. Thus, the method may be adjusted to changing environments in a simple and quick manner.

A frame rate of the optical sensor may be adjusted to the walking speed determined. The distance measurement is adjusted to the person's walking speed. If the person walks quickly towards the obtaining area, the image information of the distance image may take place at, e.g., up to 20 frames/second. If the person walks slower, the image rate may be reduced to, e.g., 10 frames/second.

After determining a targeted approach, lines may be projected onto the floor indicating the operating area of the optical sensor. Merely lines or a trapezoid, and no point, on the floor are sufficient, as, thanks to the step determination, no movement on a spot or a small area is required to operate the actuator. Visibility of the operating area may herewith also be ensured in case of strong sunshine.

It may be that the lines are projected and/or the actuator is operated if the person has successfully been identified by a keyless access system of the vehicle. The person's identity and/or the person's authorization to open the vehicle is thus verified. For example, this may be done using a keyless access method. If an authorization to open the vehicle is available, the method continues. If not, the method is discontinued.

It may further be provided that, for the determination of a targeted approach of steps, an object determination based on data of the optical sensor is performed, wherein a pair of feet and the sequence of steps of the individual feet are detected. If it relates to a pair of feet, i.e., two feet including two legs, the object to be obtained is examined with regard to the targeted movement of steps made by the feet and/or legs. Thus, incorrect operations, e.g., by passing animals or objects, e.g., umbrellas, may be prevented. In the sequence of gestures to open the tailgate, a foot or leg is expected in the obtaining area and the rear standing foot or leg is looked for in the extended obtaining area. It may be provided that always two feet or also legs in a spread position are expected for the desired request to open or close the tailgate.

It may further be provided that trajectory points determined using centroids are used for a movement determination of the sequence of steps. Centroids are easy to determine, which allows for a quick processing at a low computing capacity as well. Per image, one centroid is calculated for each foot and/or each leg, and these points are connected to two trajectories via the image sequence. Using the trajectories, the movement may be determined in a simple and precise manner.

The inventive apparatus for external operation of an actuator of a vehicle, comprising an optical TOF sensor and a control unit, wherein the optical TOF sensor and the control unit are configured to obtain an approach of a person in an approach area of the optical TOF sensor, provides that the optical TOF sensor and the control unit are configured to determine, within an obtaining area of the optical TOF sensor, a targeted approach of a person's steps towards an operating area of the optical TOF sensor, and that the control unit is configured to operate the actuator when a step made into the operating area of the optical TOF sensor is determined. The same advantages and modifications as described above apply. Here, the characteristic of a TOF (Time of Flight) sensor is particularly suitable, as both the distance of the feet or legs and an optical image, which may be processed as described above, are output.

A light source may be provided that is configured to optically mark the operating area. In addition to illustrating the target area, this may be used to give feedback to the person approaching on the positive determination of an authorization to open the vehicle and/or carry out the method for operating a flap or door.

The light source may be configured to project lines onto the floor. Merely lines or a trapezoid, and no point, on the floor are sufficient, as, thanks to the step determination, no movement on a spot or a small area is required to operate the actuator. Visibility of the operating area may herewith also be ensured in case of strong sunshine.

The control device may be configured to carry out an object determination based on data of the optical TOF sensor. As described above, object determination allows for a targeted determination and evaluation of steps and/or foot positions, which simplifies and speeds up the operation for the person.

The inventive vehicle having an actuator comprises an apparatus as described before. The same advantages and modifications as described above apply.

It may be provided that the actuator operates a tailgate of the vehicle and that the apparatus for external operation of the actuator is arranged in a tailgate area of the vehicle. This is a favorable application as, e.g., after a shop both hands are full, and it is easier to open the tailgate without using one's hands and any gestures made by the feet.

Further preferred configurations of the invention result from the remaining features stated in the sub-claims.

The various embodiments of the invention mentioned in this application can advantageously be combined with each other unless otherwise stated in the individual case.

The invention is hereinafter explained in embodiments using the associated drawings, in which:

FIG. 1 shows an area of a vehicle 10, e.g., a section of a rear bumper of a passenger vehicle. Trucks, buses, motorcycles, rail vehicles as well as aircrafts and watercrafts continue to be deemed to be vehicles.

Figure 1:
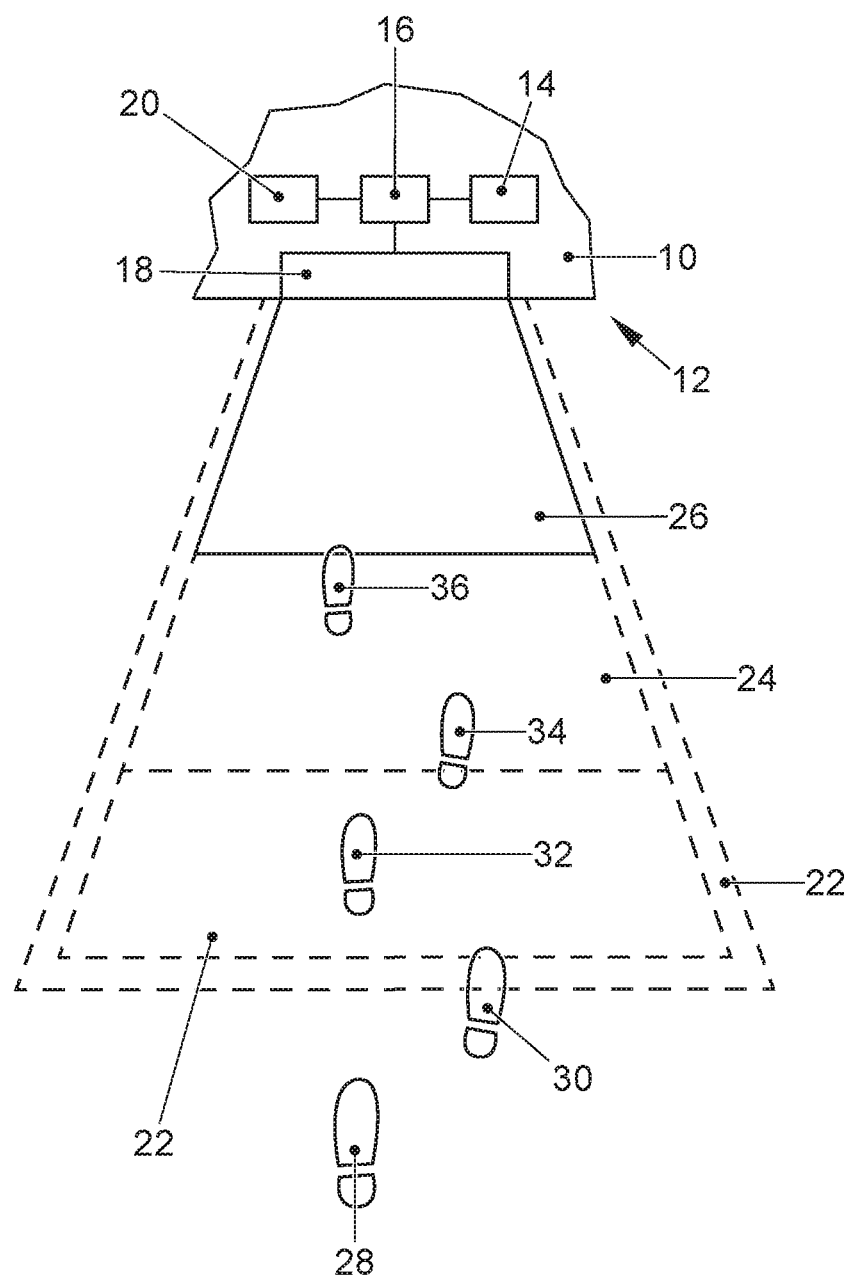
FIG. 1 shows a schematic representation of an apparatus for external operation of an actuator of a vehicle.

The vehicle 10 comprises an apparatus 12 for external operation of an actuator 14 of the vehicle 10. For example, the actuator 14 is an electric motor to open and/or to close a trunk lid. The apparatus 12 comprises a control device 16 connected to the actuator 14, directly or via further elements, e.g., further control devices. The apparatus 12 further comprises a light source 18 and an optical TOF sensor 20 (Time of Flight).

The TOF sensor 20 comprises an approach area 22 that may comprise several sub-areas. The approach area may correspond to the maximum range of the sensor 20, which may, for example, be approximately two meters, or may be limited to a range of approximately two meters' distance from the vehicle 10 or the sensor 20. The approach area 22 is, to some extent, a virtual area defined and used, e.g., via image processing and/or object determination in the control device 16. The approach area 22 serves to obtain a first approach of an object, e.g., a person, and to start the method.

An obtaining area 24 laterally surrounded by the approach area 22 as well connects to the approach area 22 in the direction of the vehicle 10. In the obtaining area 24, the sensor 18 and the control device 16 may determine a targeted approach of a person's steps towards the sensor 18. Like the approach area 22, the approach area 22 is, to some extent, a virtual area.

An operating area 26 laterally surrounded by the approach area 22 as well connects to the obtaining area 24 in the direction of the vehicle 10. It is possible to mark the operating area 26 on the floor next to the vehicle 10 using a trapezoidal light projection from the light source 18. Thus, a person wanting to operate the actuator 14 knows where they have to move. The light source 18 may comprise a square optic so that a trapezoidal projection results on the floor due to an angular arrangement in the vehicle 10.

A method for external operation of the actuator 14 of the vehicle 10 is described below. When the vehicle 10 is parked, the sensor 18 monitors the approach area 22. As soon as the sensor 18 perceives something, a signal and/or an image is sent to the control device 16 for an evaluation.

Now the approach of a person is considered. The sensor 18 and/or the control device 16 follows an algorithm to not only determine an approach but also to detect steps and, based on the direction of the steps, to conclude on the person's intention in order to enable quick processing.

A first step 28, here of the person's left foot, already aims in the direction of the vehicle 10. However, it is not yet obtained as it is outside the approach area 22. The next step 30 is made into the approach area 22 and is obtained by the sensor 20. At first, the sensor 20 only sends a message to the control device 16 that now arranges for the person to be identified by a keyless access system of the vehicle 10. If the person has no authorization, the method is not continued. Monitoring by the sensor 20 may be paused for a specified period in order to thus wait for the person to walk on. In case of successful identification of the person, the control device 16 arranges for an activation of the light source 18 so that the trapezoid is projected onto the floor. Likewise, the data of the sensor 20, i.e., distance or 3D data and image or 2D data, is now transferred to the control unit 16 for evaluation.

Based on the direction of the step 30, a person passing by may also be detected. This person's foot is not directed towards the vehicle 10, but turned by 90 degrees. When the control device 16 determines a person passing by, it is proceeded as if no authorization is available.

Meanwhile the person has made a further step 32 in the direction of the sensor 20. The next step 34 is made into the obtaining area 24. Now the person's steps are closely analyzed. The boundary between the approach area 22 and the obtaining area 24 is adaptive and may be adjusted depending on the person's walking speed amongst others. In case of a person moving fast, the obtaining area 24 may, for example, be extended.

The temporal resolution of the sensor data may, for example, be approximately five to thirty images or frames per second. Depending on the person's walking speed, this may be adjusted, e.g., within ten to twenty images per second.

When the next step 36 is made, the apparatus 12 detects a rear standing foot 34 directed at the vehicle 10 and the movement of the front foot in the direction of the vehicle 10. Now the apparatus 12 may already conclude on the request to operate the actuator 14 and may already arrange for an operation while the foot is still moving. This allows a very flowing operation without any dead times or additional movements. The steps stated here may also be considered to be feet.

Figure 2:
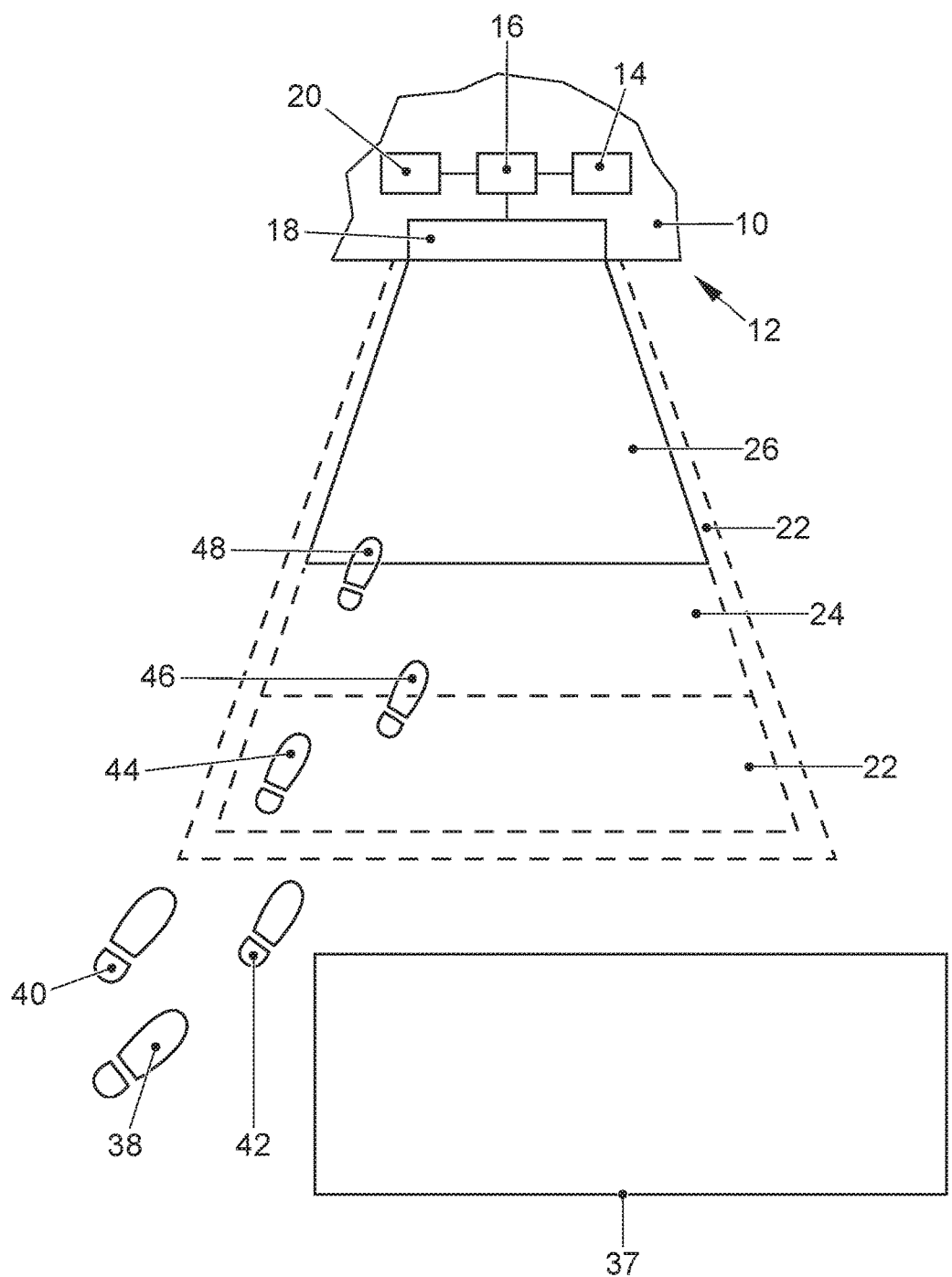
FIG. 2 shows a schematic representation of an apparatus for external operation of an actuator of a vehicle with an obstacle.

In FIG. 2, another situation is illustrated, wherein an obstacle 37 is located behind the vehicle 10. Accordingly, the size of the approach area 22 and of the obtaining area 24 were now adjusted in a way that a reduction was performed so that the areas are adjusted to the obstacle 37.

Due to the obstacle 37, the person initially moves in lateral direction towards the vehicle 10 with the steps 38, 40 and 42. These steps are not yet obtained as they are still outside the dynamically adjusted approach area 22. The step 44 is half turned towards the vehicle 10 and is obtained by the sensor 20. Even in case of a successful identification, it may be provided that the light source 18 is not yet activated, as it may be that, even though the person is authorized, they want to walk past the vehicle 10.

The step 46 is fully directed at the vehicle 10 and/or the sensor 20. Now the light source 18 is activated. The person's steps are now closely analyzed, as the step 46 was also made into the obtaining area 24. The next step 48 and/or its determination triggers the actuator 14 in line with the description of FIG. 1.

Figure 3:
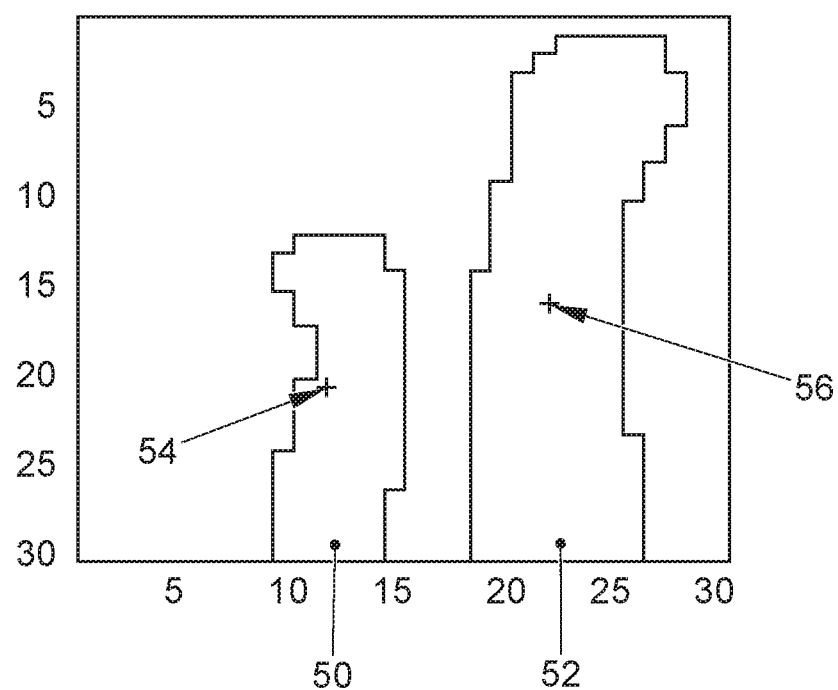
FIG. 3 shows a schematic representation of sensor data.

In FIG. 3, an image or frame of the sensor 20 is illustrated. The sensor 20 comprises thirty times thirty image points or pixels plotted on the edges of the illustration. A first foot 50 and a second foot 52 are illustrated. When the term foot is used here, this may also comprise a part of the leg, e.g., a lower leg. This image does not comprise any direct distance information, but illustrates a 2D image of the foot area of the person approaching.

For the image processing, the relative position and the alignments of both feet are detectable. In a first step, both feet are determined in order to determine the approaching of a person. The two feet 50 and 52 are considered separately to arrive at a better statement concerning the person's direction of movement. For each sensor image, as illustrated in FIG. 3, the corresponding centroid 54 and/or 56 is calculated for each foot 50 and/or 52. Using the chronologically consecutive centroids 54 and 56, movement trajectories are formed based on which the movements of the two feet 50 and 52 may easily be tracked and also predicted.

The method steps described are executed in the control device 16 or in another computing unit of the vehicle 10.

In summary, it is presented a novel method for advance determination and evaluation as to whether an actuator 14 is to be operated on the vehicle 10 in the near future. By this timely determination of the person's intention, dead times in the operation may be omitted.

LIST OF REFERENCE NUMBERS 10 vehicle
12 apparatus
14 actuator
16 control device
18 light source
20 sensor
22 approach area
24 obtaining area
26 operating area
28 step
30 step
32 step
34 step
36 step
37 obstacle
38 step
40 step
42 step
44 step
46 step
48 step
50 foot
52 foot
54 centroid
56 centroid

What is claimed is:

1. A method for external operation of an actuator of a vehicle, having an optical sensor, the method comprising:
    obtaining an approach of a person in an approach area of the optical sensor;
    determining, within an obtaining area of the optical sensor, a targeted approach of a person's steps towards an operating area of the optical sensor, wherein the targeted approach is determined based on the detection of a pair of feet, the orientation of said feet, and the sequence of steps of the individual feet;
    wherein the size of the approach area and/or the size of the obtaining area is dynamically adjusted to environmental conditions detected by the optical sensor; and
    operating the actuator when a step made into the operating area of the optical sensor is determined.

2. The method of claim 1, wherein determining the targeted approach of the person's steps towards the operating area of the optical sensor further comprises determining the person's walking speed, characterized in that a frame rate of the optical sensor is adjusted to the walking speed determined.

3. The method of claim 1, characterized in that, after the determination of the targeted approach, lines are projected onto the floor indicating the operating area of the optical sensor.

4. The method of claim 3, characterized in that the lines are projected and/or the actuator is operated if the person has successfully been identified by a keyless access system of the vehicle.

5. The method of claim 1, characterized in that trajectory points determined using centroids are used for a movement determination of the sequence of steps.

6. An apparatus for external operation of an actuator of a vehicle, comprising:
    an optical TOF (Time of Flight) sensor and a control unit,
    wherein the optical TOF sensor and the control unit are configured to obtain an approach of a person in an approach area of the optical TOF sensor,
    wherein the optical TOF sensor and the control unit are configured to determine, within an obtaining area of the optical TOF sensor, a targeted approach of a person's steps towards an operating area of the optical TOF sensor, wherein the targeted approach is determined based on the detection of a pair of feet, the orientation of said feet, and the sequence of steps of the individual feet, wherein the size of the approach area and/or the size of the obtaining area is dynamically adjusted to environmental conditions detected by the optical sensor, and wherein the control unit is configured to operate the actuator when a step made into the operating area of the optical TOF sensor is determined.

7. The apparatus of claim 6, characterized in that a light source is provided configured to optically mark the operating area.

8. The apparatus of claim 7, characterized in that the light source is configured to project lines onto the floor.

9. The apparatus of claim 6, characterized in that the control unit is configured to perform an object determination based on data of the optical TOF sensor.

10. A vehicle comprising an actuator and an apparatus for the external operation of said actuator, the apparatus comprising:

an optical TOF (Time of Flight) sensor and a control unit, wherein the optical TOF sensor and the control unit are configured to obtain an approach of a person in an approach area of the optical TOF sensor, wherein the optical TOF sensor and the control unit are configured to determine, within an obtaining area of the optical TOF sensor, a targeted approach of a person's steps towards an operating area of the optical TOF sensor, wherein the targeted approach is determined based on the detection of a pair of feet, the orientation of said feet, and the sequence of steps of the individual feet, wherein the size of the approach area and/or the size of the obtaining area is dynamically adjusted to environmental conditions detected by the optical sensor, and wherein the control unit is configured to operate the actuator when a step made into the operating area of the optical TOF sensor is determined.

11. The vehicle of claim 10, characterized in that the actuator operates a tailgate of the vehicle and that the apparatus for external operation of the actuator is arranged in a tailgate area of the vehicle.

* * * * *